(12) United States Patent
Hasegawa et al.

(10) Patent No.: US 11,820,211 B2
(45) Date of Patent: Nov. 21, 2023

(54) DOOR BEAM STRUCTURE

(71) Applicant: HONDA MOTOR CO., LTD., Tokyo (JP)

(72) Inventors: Atsushi Hasegawa, Wako (JP); Yoshihiro Fujimura, Tokyo (JP); Yasuhisa Egawa, Tokyo (JP); Yumi Saito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 25 days.

(21) Appl. No.: 17/682,273

(22) Filed: Feb. 28, 2022

(65) Prior Publication Data

US 2022/0314755 A1 Oct. 6, 2022

(30) Foreign Application Priority Data

Mar. 31, 2021 (JP) .................................. 2021-059322

(51) Int. Cl.
B60J 5/04 (2006.01)

(52) U.S. Cl.
CPC ............ B60J 5/0429 (2013.01); B60J 5/0443 (2013.01)

(58) Field of Classification Search
CPC ...... B60J 5/0429; B60J 5/0443; B60J 5/0437; B60J 5/0444; B60J 5/0461; B60J 5/042; B60J 5/0422; B60J 5/0456
USPC ........................................................ 296/146.6
See application file for complete search history.

(56) References Cited

U.S. PATENT DOCUMENTS

| | | | | |
|---|---|---|---|---|
| 5,314,228 A | * | 5/1994 | Figge, Sr. | B60J 5/0447 49/501 |
| 5,992,922 A | * | 11/1999 | Harbig | B60J 5/0444 296/146.6 |
| 10,099,541 B2 | * | 10/2018 | Baccouche | B29D 99/0003 |
| 10,974,578 B2 | * | 4/2021 | Im | B60J 5/0444 |
| 2008/0217941 A1 | * | 9/2008 | Chernoff | B60N 3/023 296/1.02 |
| 2022/0258578 A1 | * | 8/2022 | Faruque | B60J 5/0459 |

FOREIGN PATENT DOCUMENTS

| | | | | |
|---|---|---|---|---|
| EP | 1194317 A1 | * | 4/2002 | ............ B60J 5/0444 |
| EP | 3197697 A1 | * | 8/2017 | ............ B21D 22/022 |
| JP | 2005-212598 A | | 8/2005 | |
| JP | 2005-297856 A | | 10/2005 | |
| JP | 2007-106160 A | | 4/2007 | |
| JP | 2014-201171 A | | 10/2014 | |

OTHER PUBLICATIONS

Japanese Office Action received in corresponding Japanese application No. 2021-059322 dated Aug. 30, 2022 with English translation (10 pages).

* cited by examiner

*Primary Examiner* — Amy R Weisberg
*Assistant Examiner* — Veronica M Shull
(74) *Attorney, Agent, or Firm* — Rankin, Hill & Clark LLP

(57) ABSTRACT

A door beam structure includes a door beam attached to a side door so as to extend along a longitudinal axis of a vehicle. The door beam has a curved shape extending outwardly along a transverse axis of the vehicle and is spaced apart from a door skin in an inward direction along the transverse axis as the door beam extends to opposite end portions, along the longitudinal axis, of the door beam. The door beam includes a first end portion located in a frontward direction along the longitudinal axis, the first end portion (Continued)

being opposite to a center pillar. The first end portion is provided with a crush box.

6 Claims, 11 Drawing Sheets ately, "front-rear" represents a vehicle front-rear direction, "left-right" represents a vehicle width direction (left-right direction), and "up-down" represents a vehicle up-down direction (vertically up-down direction).
DOOR BEAM STRUCTURE

CROSS REFERENCE TO RELATED APPLICATIONS

This application claims the foreign priority benefit under 35 U.S.C. § 119 of Japanese patent application No. 2021-059322 filed on Mar. 31, 2021, the disclosure of which is incorporated herein by reference.

BACKGROUND OF THE INVENTION

1. Field of the Invention

The present invention relates to a door beam structure including a door beam attached to a side door of a vehicle such, for example, as an automobile so as to extend along a longitudinal axis of the vehicle.

2. Description of the Related Art

JP2014-201171A, for example, discloses a door beam structure in which door beams are each provided at one end with a protruding portion protruding toward a center pillar.

In JP2014-201171A, this protruding portion is provided to enable a lower portion of the center pillar to be bent toward the cabin at the time of a side collision.

However, when the door beams disclosed in JP2014-201171A receive a side collision load in the door-beam vehicle width direction, the side collision load in the vehicle width direction is directly transmitted to the center pillar.

This leads to a concern that the load absorption characteristics of the door beams at their center portions may decrease.

The present invention has been made to solve the above problem and makes it an object thereof to provide a door beam structure capable of efficiently transmitting a side collision load input to a door beam to a vehicle body frame side.

SUMMARY OF THE INVENTION

In response to the above issue, it is an object of the present invention to provide a door beam structure including a door beam attached to a side door so as to extend along a longitudinal axis of a vehicle. The door beam has a curved shape extending outwardly along a transverse axis of the vehicle and is spaced apart from a door skin in an inward direction along the transverse axis as the door beam extends to opposite end portions, along the longitudinal axis, of the door beam.

According to the present invention, it is possible to obtain a door beam structure capable of efficiently transmitting a side collision load input to a door beam to a vehicle body frame side.

DETAILED DESCRIPTION OF THE EMBODIMENTS

Figure 1:
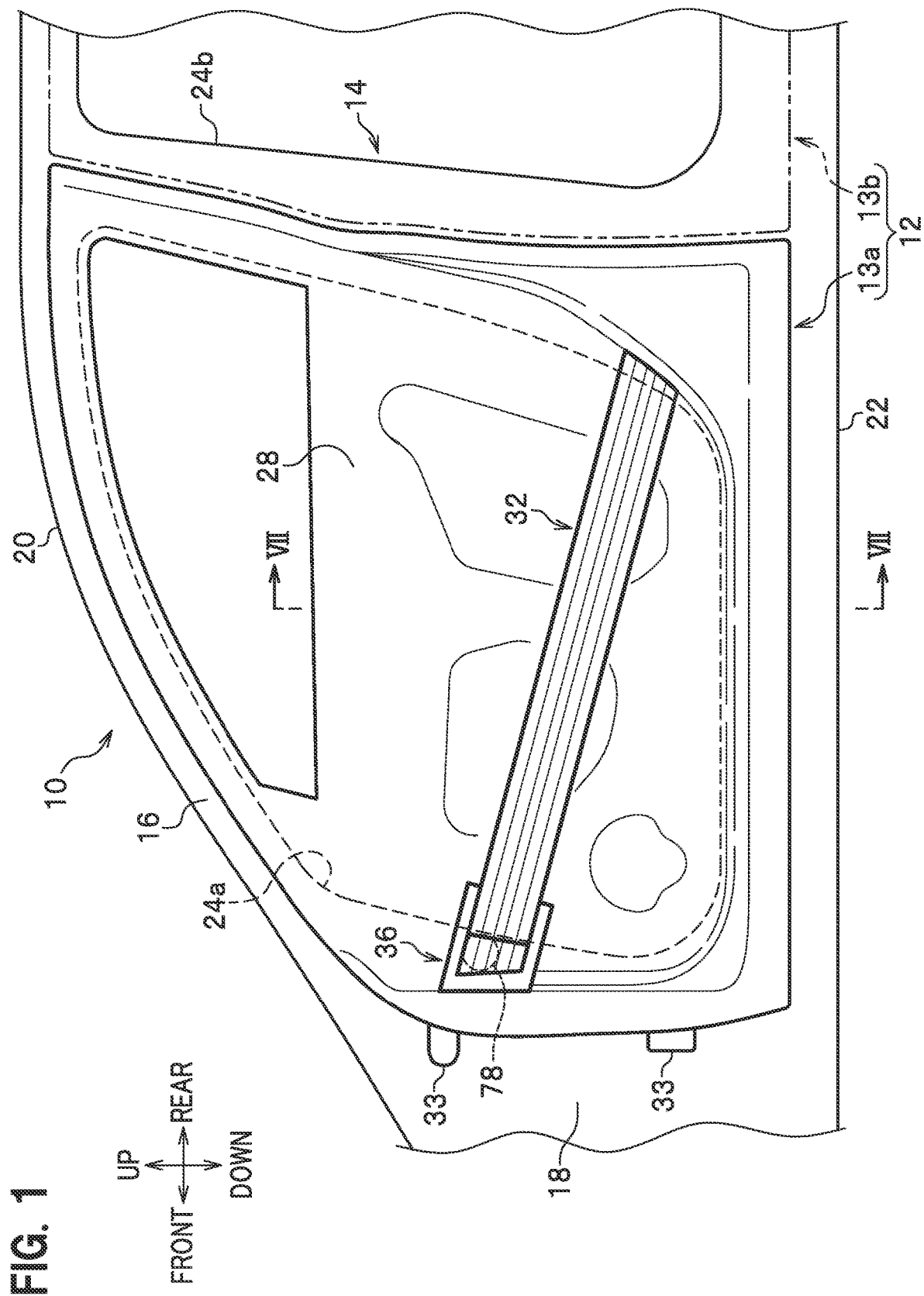
FIG. 1 is a partially imaginary side view of a vehicle body side part of a vehicle employing a door beam structure according to an embodiment of the present invention.

Next, an embodiment of the present invention will be described in detail with reference to the drawings as appropri As shown in FIG. 1, a vehicle employing a door beam structure according to the embodiment of the present invention includes side doors 12 and a center pillar 14 provided at each vehicle body side part 10. The side doors 12 include a front door 13a and a rear door 13b. Note that in the present embodiment, the side doors 12 will be described below by mainly taking the front door 13a as an example, but the rear door 13b will also be described as appropriate.

As shown in FIG. 1, at each vehicle body side part 10, there are a front pillar 16 and a front pillar lower 18 located on the front side of the vehicle, the center pillar 14 located at a center portion of the vehicle, and a rear pillar not shown located on the rear side of the vehicle, each of which is disposed along a substantially up-down direction. Also, a roof side rail 20 is disposed at an upper portion of each vehicle body side part 10 and a side sill 22 is disposed at a lower portion of the vehicle body side part 10, both extending along the vehicle front-rear direction. Note that the vehicle body side parts 10 are formed in laterally symmetrical shapes. Thus, the left side part will be described in detail, and description of the right side part will be omitted.

The vehicle body side part 10 is provided with a door opening portion where the side doors 12 are mounted in an openable and closable manner. This door opening portion has a front door opening portion 24a and a rear door opening portion 24b. The front door opening portion 24a is formed in a substantially quadrangular shape by the front pillar 16, the front pillar lower 18, the roof side rail 20, the center pillar 14, and the side sill 22. The rear door opening portion 24b is formed in a substantially quadrangular shape by the center pillar 14, the roof side rail 20, the rear pillar not shown, and the side sill 22.

Figure 5:
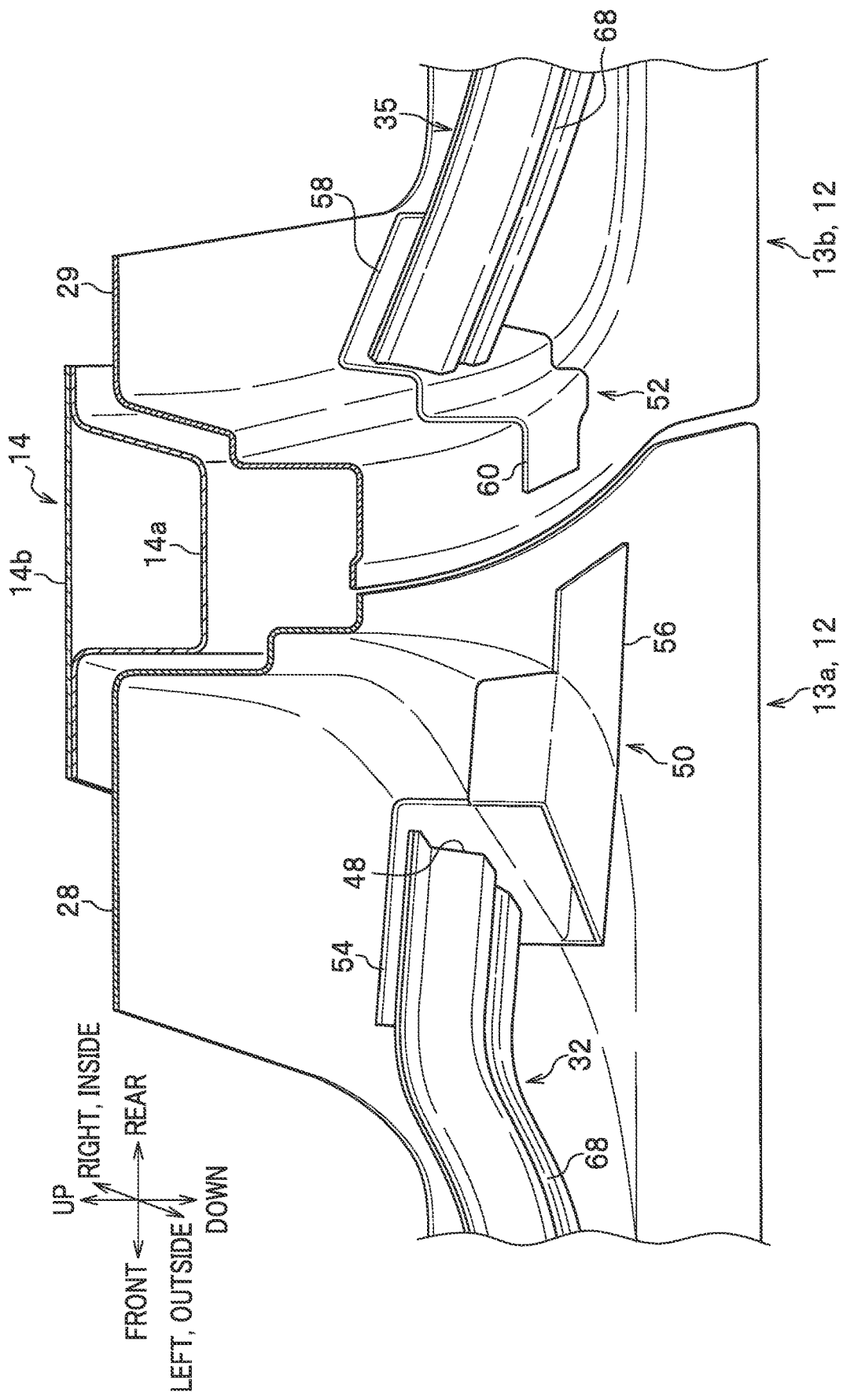
FIG. 5 is a partially cutout, enlarged perspective view showing a vehicle rear-side end of the door beam disposed in a front door and a vehicle front-side end of a door beam disposed in a rear door.
Figure 6:
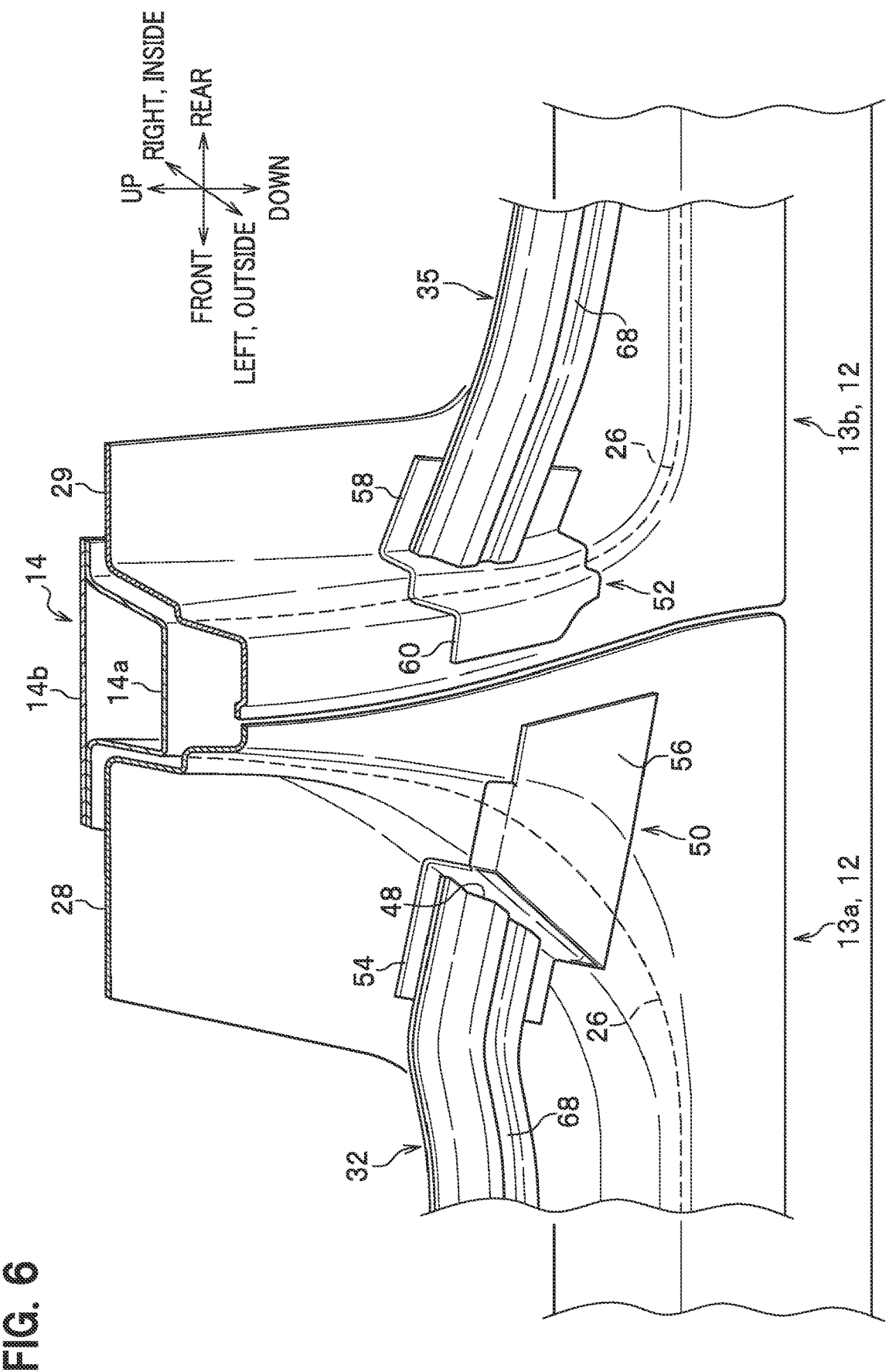
FIG. 6 is a partially imaginary perspective view showing a flaring portion of a lower part of a center pillar.

As shown in FIGS. 5 and 6, the center pillar 14 includes a center pillar outer 14a disposed on an outer side in the vehicle width direction, a center pillar inner 14b disposed on an inner side in the vehicle width direction, and a stiffener not shown disposed between the center pillar outer 14a and the center pillar inner 14b.

The center pillar 14 is provided to extend along the up-down direction between the roof side rail 20 and the side sill 22 such that its widthwise dimension in the vehicle front-rear direction increases from the upper side toward the lower side. At a lower portion of the center pillar 14 coupled to the side sill 22, a flaring portion 26 (see FIG. 6) is provided whose widthwise dimension in the vehicle front-rear direction becomes largest toward the lower side.

Figure 7:
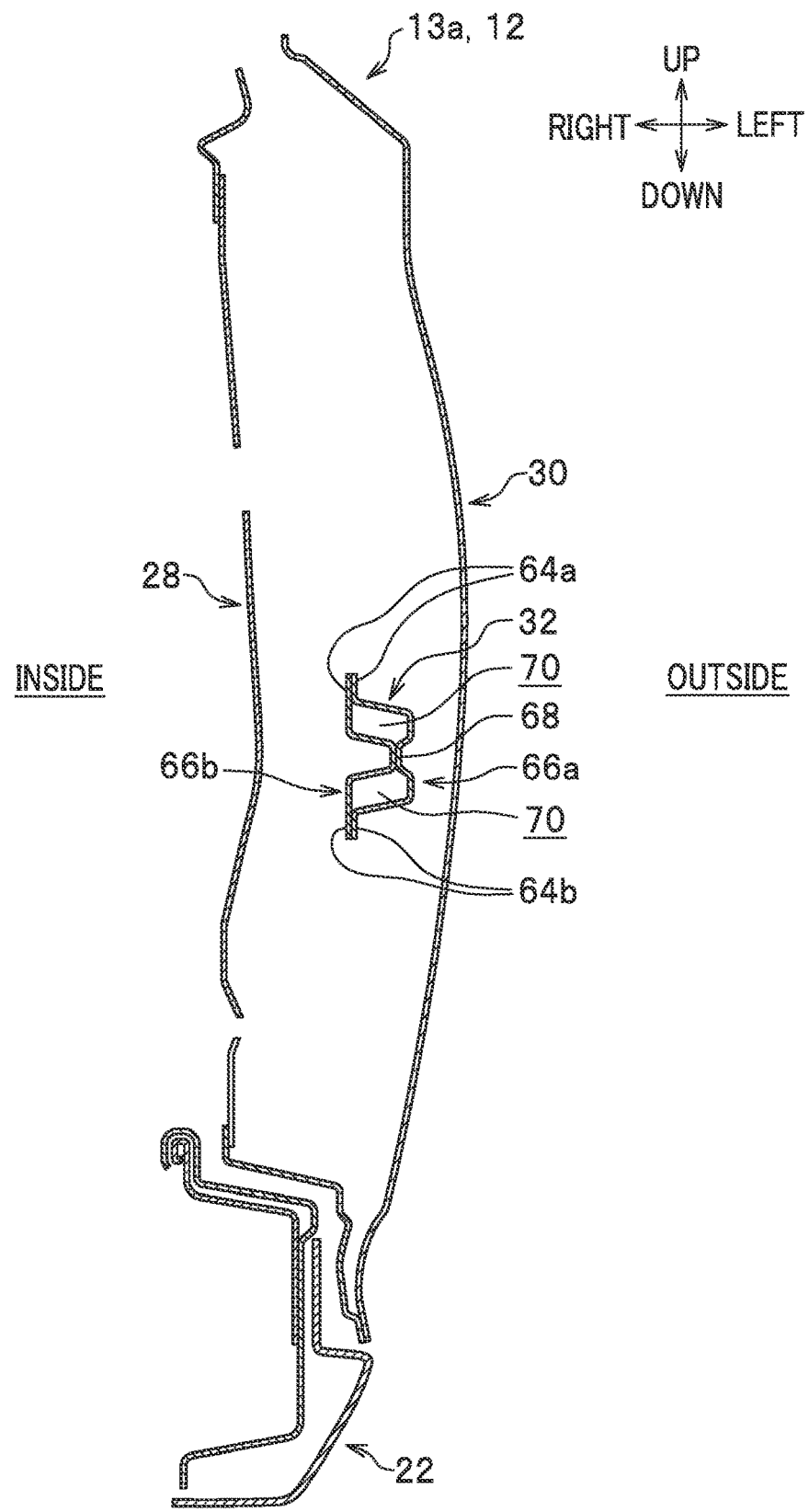
FIG. 7 is a cross-sectional view along line VII-VII in FIG. 1.

The front door 13a is formed as a door member that opens and closes the front door opening portion 24a. As shown in FIG. 7, this front door 13a includes a door inner panel 28 disposed on the cabin side and forming the door body, a door skin (door outer panel) 30 attached on the outer side of the door inner panel 28 in the vehicle width direction, a door beam 32 provided to the door inner panel 28, and door hinge members (door hinges) 33 (see FIG. 1) for pivotally attaching the front door 13a to the vehicle body. These door hinge members 33 include an upper door hinge and a lower door hinge.

Figure 3:
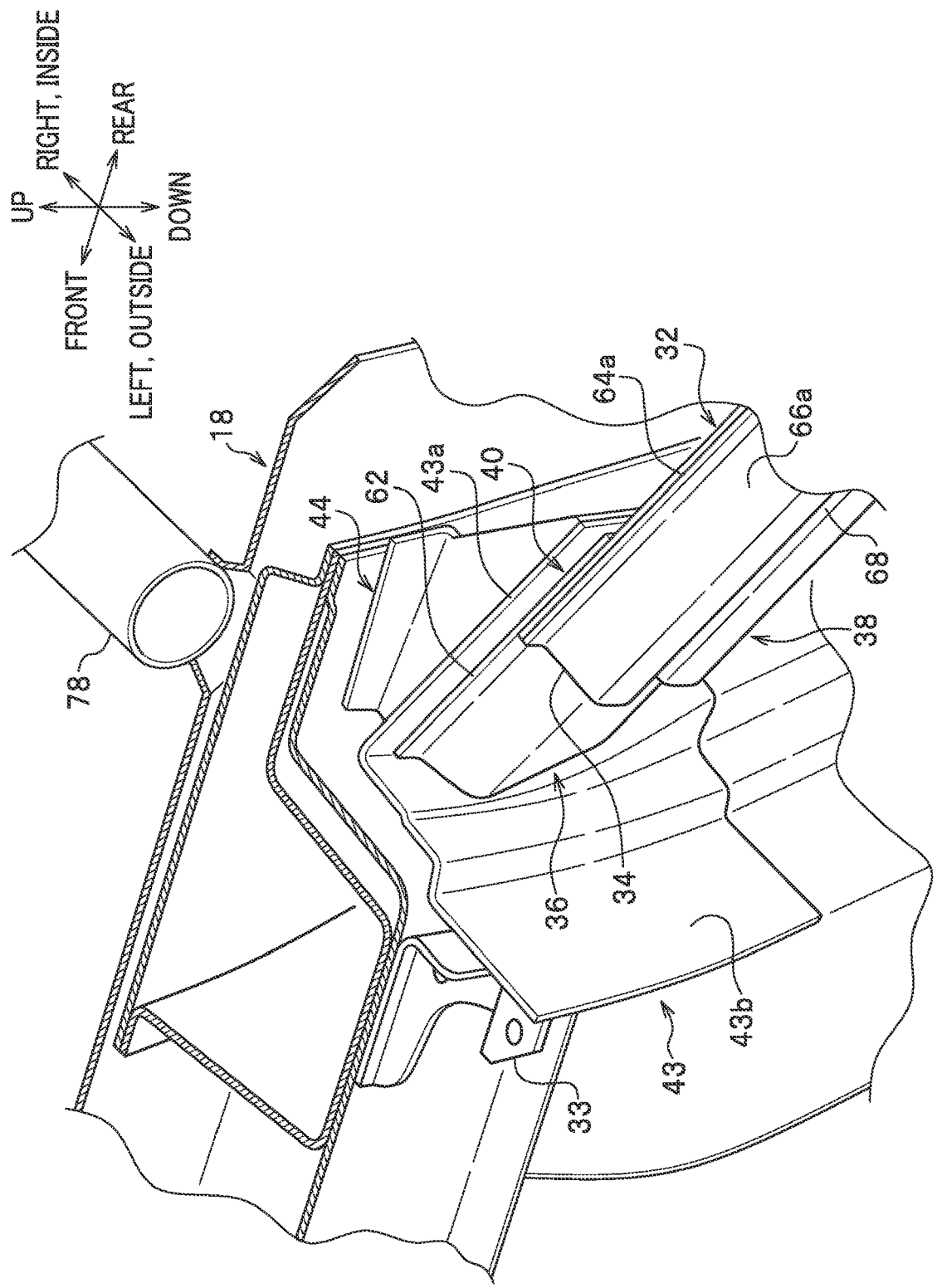
FIG. 3 is a partially cutout, enlarged perspective view of a vehicle front-side end of the door beam shown in FIG. 2.
Figure 4:
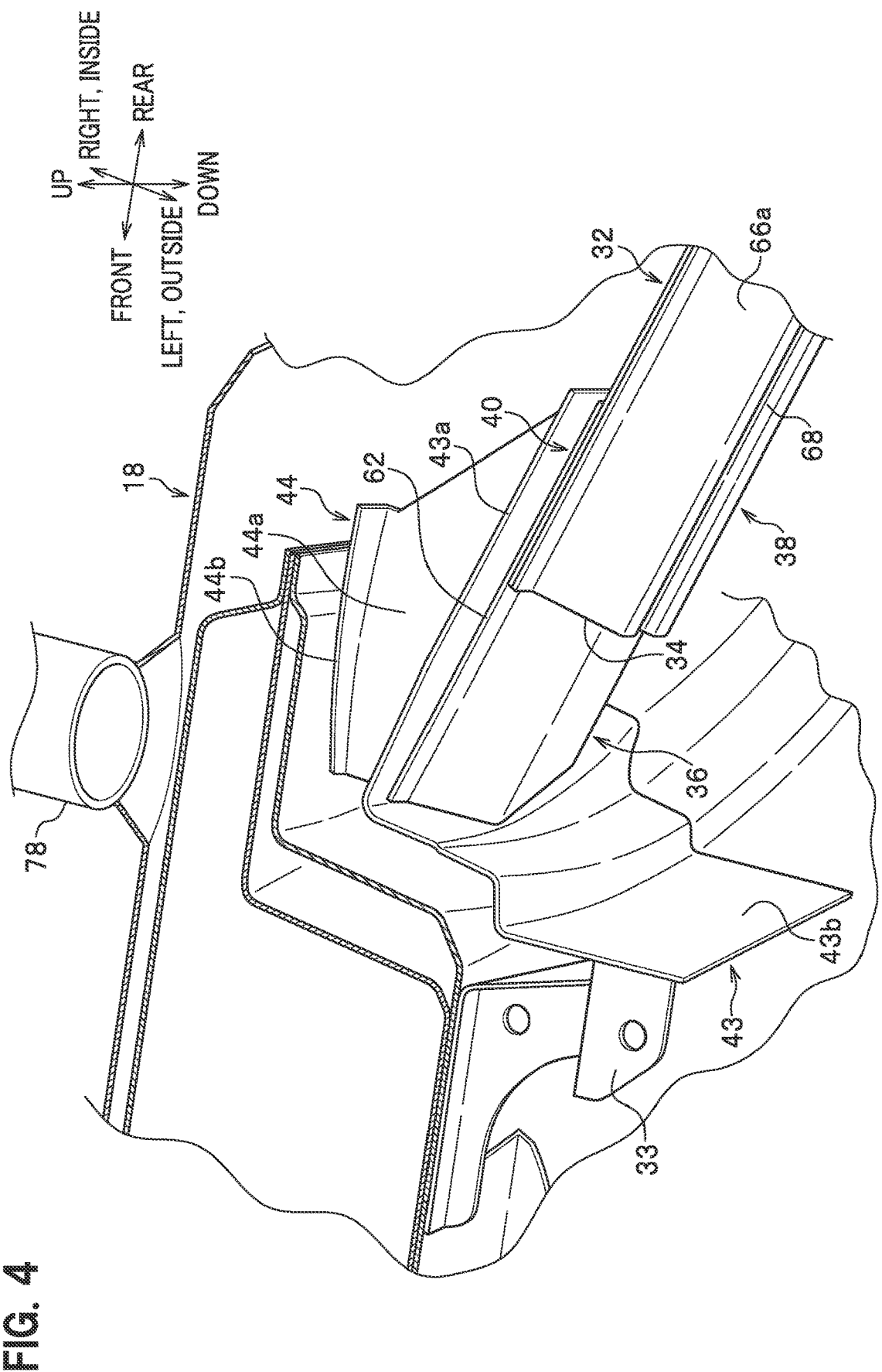
FIG. 4 is a partially cutout, enlarged perspective view of the vehicle front-side end of the door beam shown in FIG. 2.

As shown in FIG. 1, the door beam 32 is provided to extend along the vehicle front-rear direction in a side view. As shown in FIGS. 3 and 4, a crush box 36 that functions as a fragile portion is provided at a vehicle front-side end 34 of the door beam 32, which is the end opposite the center pillar 14. A vehicle front-side portion 38 of the door beam 32 including the vehicle front-side end 34 overlaps a vehicle rear-side portion 40 of the crush box 36 and covers the crush box 36 from the outer side. Also, the vehicle front-side portion 38 of the door beam 32 and the crush box 36 are fixed to the door inner panel 28 via a beam bracket 43.

The vehicle front-side end 34 of the door beam 32 (including the crush box 36) has a gap between the door beam 32 and the inner side face of the door inner panel 28 (front door 13a) in the vehicle width direction. A coupling member 44 is inserted in this gap.

As shown in FIG. 5, a vehicle rear-side end 48 of the door beam 32 is fixed to a lower portion of the center pillar 14 via a front reinforcement member 50 to be described later. Note that in the present embodiment, the crush box 36 is provided at the vehicle front-side end 34 of the door beam 32, but the present embodiment is not limited to this configuration. The crush box 36 may be provided also at the vehicle rear-side end 48 of the door beam 32.

As shown in FIGS. 3 and 4, the beam bracket 43 assumes a substantially L-shape in a side view, and has a side plate portion 43a and a bent portion 43b formed integrally with each other. The side plate portion 43a is coupled to the entire crush box 36 and the vehicle front-side portion 38 of the door beam 32 and extends along the axial direction of the door beam 32. The bent portion 43b is bent in a substantially perpendicular direction from the vehicle front-side end of the side plate portion 43a with a step portion after the bend.

The coupling member 44 includes, in a plan view, a body portion 44a assuming a substantially triangular shape, an upper flange portion 44b provided on the upper side of the body portion 44a by folding it, and a lower flange portion not shown provided on the lower side of the body portion 44a by folding it. The upper flange portion 44b is joined to the door inner panel 28 of the front door 13a. The lower flange portion not shown is joined to the side plate portion 43a of the beam bracket 43.

The door inner panel 28 of the front door 13a and a door inner panel 29 of the rear door 13b are each provided with reinforcement members. These reinforcement members include the front reinforcement member 50 located on the front side of the center pillar 14 and a rear reinforcement member 52 located on the rear side of the center pillar 14 (see FIG. 5).

As shown in FIG. 5, the front reinforcement member 50 is provided at a lower portion of a vehicle rear-side portion of the door inner panel 28 of the front door 13a and is disposed at the vehicle rear-side end 48 of the door beam 32. The rear reinforcement member 52 is provided at a vehicle front-side portion of the door inner panel 29 of the rear door 13b and is disposed at a vehicle front-side end of a door beam 35 of the rear door 13b. Providing the front reinforcement member 50 and the rear reinforcement member 52 can improve the stiffness and strength of a vehicle rear-side portion of a lower part of the front door 13a around the center pillar 14 and a vehicle front-side portion of a lower part of the rear door 13b around the center pillar 14.

The front reinforcement member 50 is disposed on the door inner panel 28 of the front door 13a at a position corresponding to the vehicle front-side of the flaring portion 26 of the center pillar 14. This front reinforcement member 50 has a bent portion 54 and an extending portion 56 formed integrally with each other. The bent portion 54 is disposed on an inner side in the vehicle width direction and bent in a substantially L-shape in cross section, while the extending portion 56 is disposed on an outer side in the vehicle width direction, is continuous with the vehicle rear-side end of the bent portion 54, and extends toward the rear side of the vehicle along the panel face of the door inner panel 28 of the front door 13a. The vehicle rear-side end 48 of the door beam 32 provided to the front door 13a is fixed to the bent portion 54.

The rear reinforcement member 52 is disposed on the door inner panel 29 of the rear door 13b at a position corresponding to the vehicle rear-side of the flaring portion 26 of the center pillar 14. This rear reinforcement member 52 has an inner bent portion 58 and an outer bent portion 60 formed integrally with each other. The inner bent portion 58 is disposed on an inner side in the vehicle width direction and bent in a substantially L-shape in cross section, while the outer bent portion 60 is disposed on an outer side in the vehicle width direction relative to the inner bent portion 58 and bent in a substantially L-shape in cross section.

Further, the front reinforcement member 50 and the rear reinforcement member 52 respectively extend from faces facing the ends (vehicle rear-side end and vehicle front-side end) of the door beams 32 and 35 of the front and rear doors 13a and 13b to the outer side face of the center pillar 14 in the vehicle width direction in a traversing manner.

The crush box 36 is made of an energy absorption member in the shape of a substantially quadrangular tube, and absorbs a collision load by undergoing compressive deformation in the axial direction. As shown in FIGS. 3 and 4, this crush box 36 has an upper flange 62 and a lower flange (not shown) extending along the axial direction and is joined to the beam bracket 43 (side plate portion 43a) by, for example, welding means such as spot welding. When a side collision load is input, the crush box 36 undergoes compressive deformation in the axial direction, which pulls and crushes the beam bracket 43 and the coupling member 44.

A vehicle front-side portion of the crush box 36 is joined to the beam bracket 43 via the upper flange 62 and the lower flange (not shown). A vehicle rear-side portion of the crush box 36 overlaps the vehicle front-side portion of the door beam 32. Three layers of members including an upper flange 64a and a lower flange 64b of the door beam 32, the upper flange 62 and the lower flange (not shown) of the crush box 36, and the beam bracket 43 are joined, for example, by spot welding or the like. The entire crush box 36 and the vehicle front-side portion of the door beam 32 including its vehicle front-side end are each fixed to the door inner panel 28 via the beam bracket 43.

Also, as shown in FIG. 7, the door beam 32 includes an outer side face part 66a having a hat-shaped cross section and disposed on an outer side in the vehicle width direction (outside), and an inner side face part 66b having a hat-shaped cross section and disposed on an inner side in the vehicle width direction (inside). The outer side face part 66a and the inner side face part 66b each have the upper flange 64a and the lower flange 64b on the opposite sides in the up-down direction. The upper flange 64a of the outer side face part 66a and the upper flange 64a of the inner side face part 66b are joined to each other, and the lower flange 64b of the outer side face part 66a and the lower flange 64b of the inner side face part 66b are joined to each other.

Further, as shown in FIG. 7, at a center portion of the outer side face part 66a in the up-down direction, a recess 68 is provided which extends along the axial direction of the door beam 32 and is concave toward the inner side face part 66b. The bottom face of this recess 68 is joined to the top face of the inner side face part 66b, and a pair of closed cross-section portions 70 each having a substantially rectangular shape are provided on the opposite sides in the up-down direction.

Figure 2:
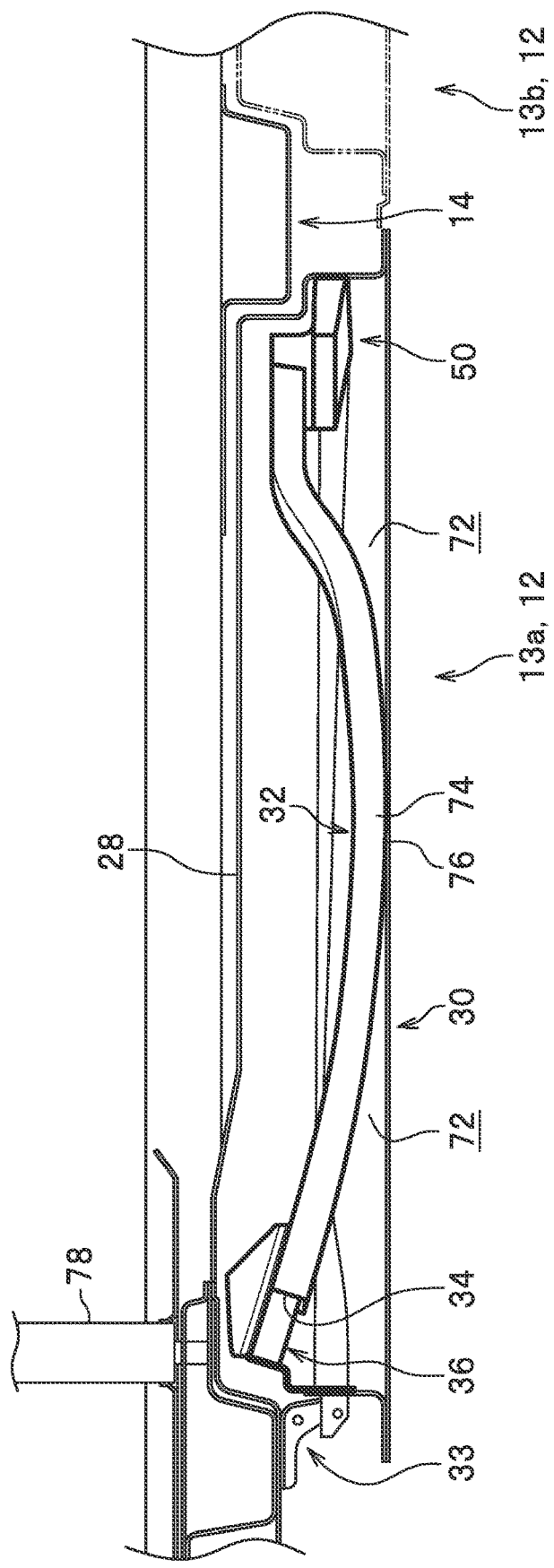
FIG. 2 is a plan view of the door beam shown in FIG. 1.

Furthermore, as shown in FIG. 2, in a plan view, the door beam 32 has a curved shape bulging outward in the vehicle width direction, and a clearance 72 is provided such that this door beam 32 gets separated farther inward in the vehicle width direction from the door skin 30 toward either end in the axial direction. Note that in the present embodiment, this clearance 72 is provided on both the vehicle front side and the vehicle rear side of the door beam 32, but the present embodiment is not limited to this configuration, and the clearance 72 may be provided on one of the vehicle front side or the vehicle rear side. This clearance 72 is smallest at an apex portion 74 at which the door beam 32 bulges farthest outward in the vehicle width direction, and becomes larger and larger toward the front and rear ends of the door beam 32. Note that a cushioning material is advantageously provided as appropriate at the portion where the clearance is smallest.

The clearance between the door beam 32 and the inner face of the door skin 30 is smallest at the apex portion 74 of the door beam 32, at which the door beam 32 bulges farthest outward in the vehicle width direction, within a middle section of the door beam 32 in the axial direction. This apex portion 74 is offset toward the rear side of the vehicle from a center portion 76 of the door beam 32 in the vehicle front-rear direction.

Furthermore, the vehicle front-side end 34 of the door beam 32 (including the vehicle front-side portion of the crush box 36) extends to a position at which it overlaps a steering hanger 78 as viewed from the vehicle width direction, and the vehicle front-side end 34 of the door beam 32 is disposed near one of the door hinge members 33 in the vehicle up-down direction (see FIGS. 3 and 4). Note that the steering hanger 78 is formed of a hollow pipe member and supports a steering column not shown.

Each vehicle body side part 10 of the vehicle employing the door beam structure according to the present embodiment is basically configured as described above. Next, its advantageous effects will be described.

In the present embodiment, in a plan view, the door beams 32 and 35 each have a curved shape bulging outward in the vehicle width direction, and the clearance 72 is provided such that these door beams 32 and 35 each get separated farther inward in the vehicle width direction from the door skin 30 toward either end in the axial direction.

In the present embodiment, when a side collision load is input, the door beams 32 and 35 are dented inward in the vehicle width direction and attempt to stretch toward the ends in the vehicle front-rear direction, so that the side collision load is converted into a vehicle front-rear direction load along the axial direction of the door beams 32 and 35. This converted vehicle front-rear direction load is efficiently transmitted to a vehicle body frame via the door beams 32 and 35. As a result, in the present embodiment, the door beams 32 and 35 are strongly fixed to the door inner panel 28 forming the door body. This can prevent detachment of the door beams 32 and 35 from the door body (door inner panel 28).

Also, in the present embodiment, the crush box 36 (fragile portion) is provided at least at the vehicle front-side end of the door beam 32, which is opposite the center pillar 14. In the present embodiment, a side collision load can be absorbed by crushing the opposite side to the center pillar 14 via the crush box 36 (fragile portion). Also, in the present embodiment, when a side collision load is input, its impact on the center pillar 14 can be minimized. In this way, an impact on the collision performance expected to be achieved on the center pillar 14 side can be avoided in a preferable manner.

Further, in the present embodiment, the vehicle front-side end 34 of the door beam 32 (including the vehicle front-side portion of the crush box 36) extends to a position where it overlaps the steering hanger 78 as viewed from the vehicle width direction. The steering hanger 78 is a member with high stiffness and strength. In this way, the door beam 32 gets crushed first to absorb a side collision load. Also, the vehicle front-side end 34 of the door beam 32 is disposed near one of the door hinge members 33 in the vehicle up-down direction. In this way, it is easy for the vehicle front-side end 34 of the door beam 32 to be crushed.

Furthermore, in the present embodiment, the vehicle front-side end 34 of the door beam 32 has a gap between the door beam 32 and the inner side face of the door inner panel 28 (front door 13a) in the vehicle width direction. The coupling member 44 is inserted in this gap.

In the present embodiment, the coupling member 44 fills the gap between the door beam 32 and the door inner panel 28 (front door 13a). This enables the vehicle front-side end 34 of the door beam 32 to be crushed stably. Also, since the gap is filled near the portion where the steering hanger 78 is fixed to the door inner panel 28, the stiffness and strength of the steering hanger 78 can be utilized more efficiently to crush the vehicle front-side end 34 of the door beam 32.

Further, in the present embodiment, the reinforcement members (front reinforcement member 50 and rear reinforcement member 52) extend from faces facing the ends (vehicle rear-side end and vehicle front-side end) of the door beams 32 and 35 of the front and rear doors 13a and 13b to the outer side face of the center pillar 14 in the vehicle width direction in a traversing manner. Thus, in the present embodiment, the reinforcement members enhance the stiffness and strength of a portion around the center pillar 14. This can prevent deformation of the center pillar 14 and resultant relative displacement of the front door 13a toward the inner side in the vehicle width direction in a sliding manner when a side collision load is input. As a result, in the present embodiment, the door beams 32 and 35 can stably absorb the side collision load.

Next, modifications of the door beam structure according to the present embodiment will be described below. Note that the same constituent elements as those in the above embodiment shown in FIGS. 1 to 7 will be given the same reference signs and detailed description thereof will be omitted.

Figure 8:
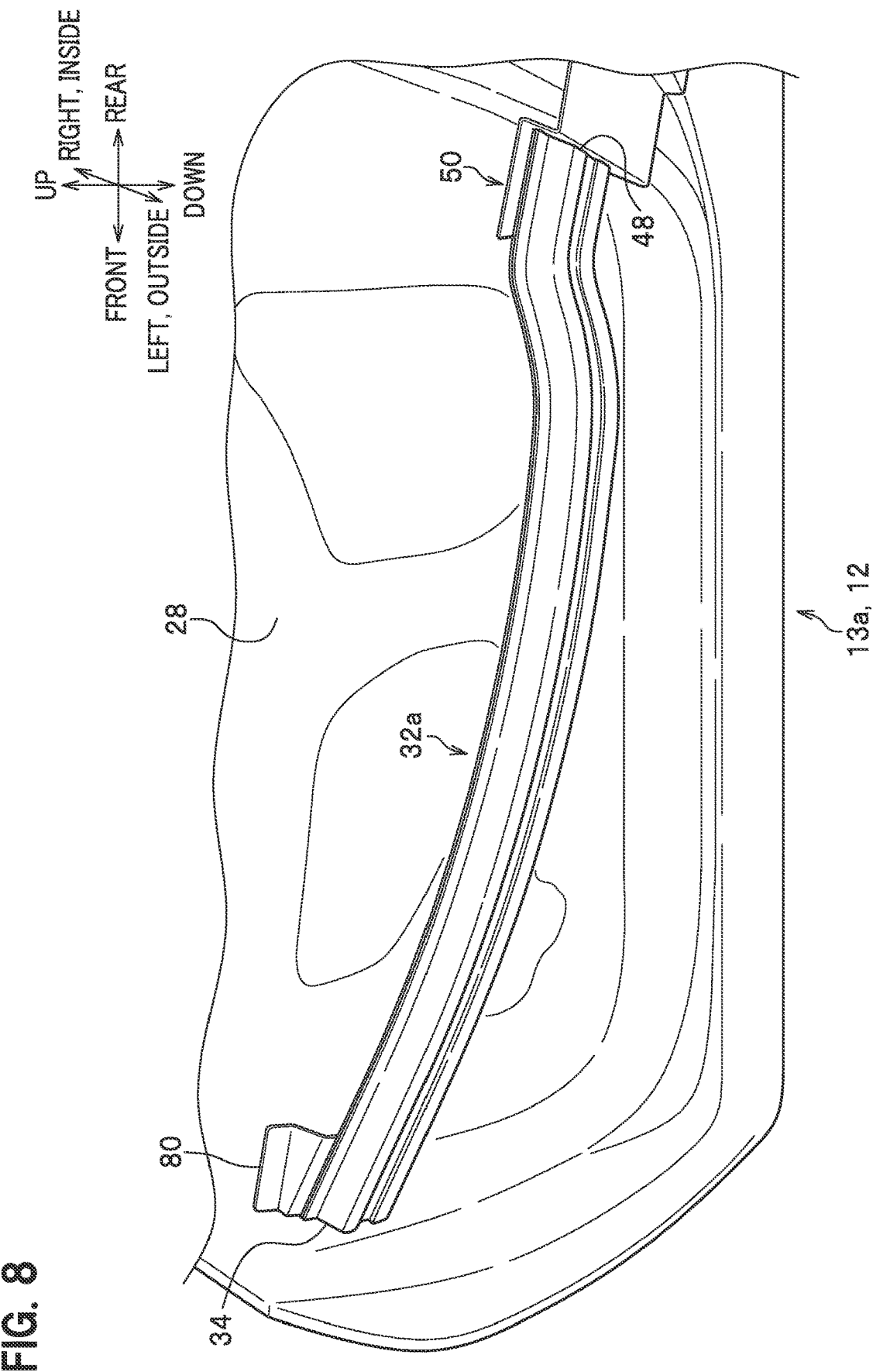
FIG. 8 is an enlarged perspective view showing a door beam structure according to a first modification.

As shown in FIG. 8, a first modification differs from the above embodiment in that the crush box 36 and the beam bracket 43 provided at the vehicle front-side end 34 of the door beam 32 in the above embodiment are omitted and the vehicle front-side end 34 of a door beam 32a is directly coupled to the door inner panel 28 via another coupling member 80. The first modification also differs from the above embodiment in that only a portion of the door beam 32a extending along the axial direction to its vehicle front-side end 34 is curved to get separated inward in the vehicle width direction from the door skin 30. Accordingly, in the first modification, the number of components is reduced, which enables a reduction in manufacturing cost.

Figure 9:
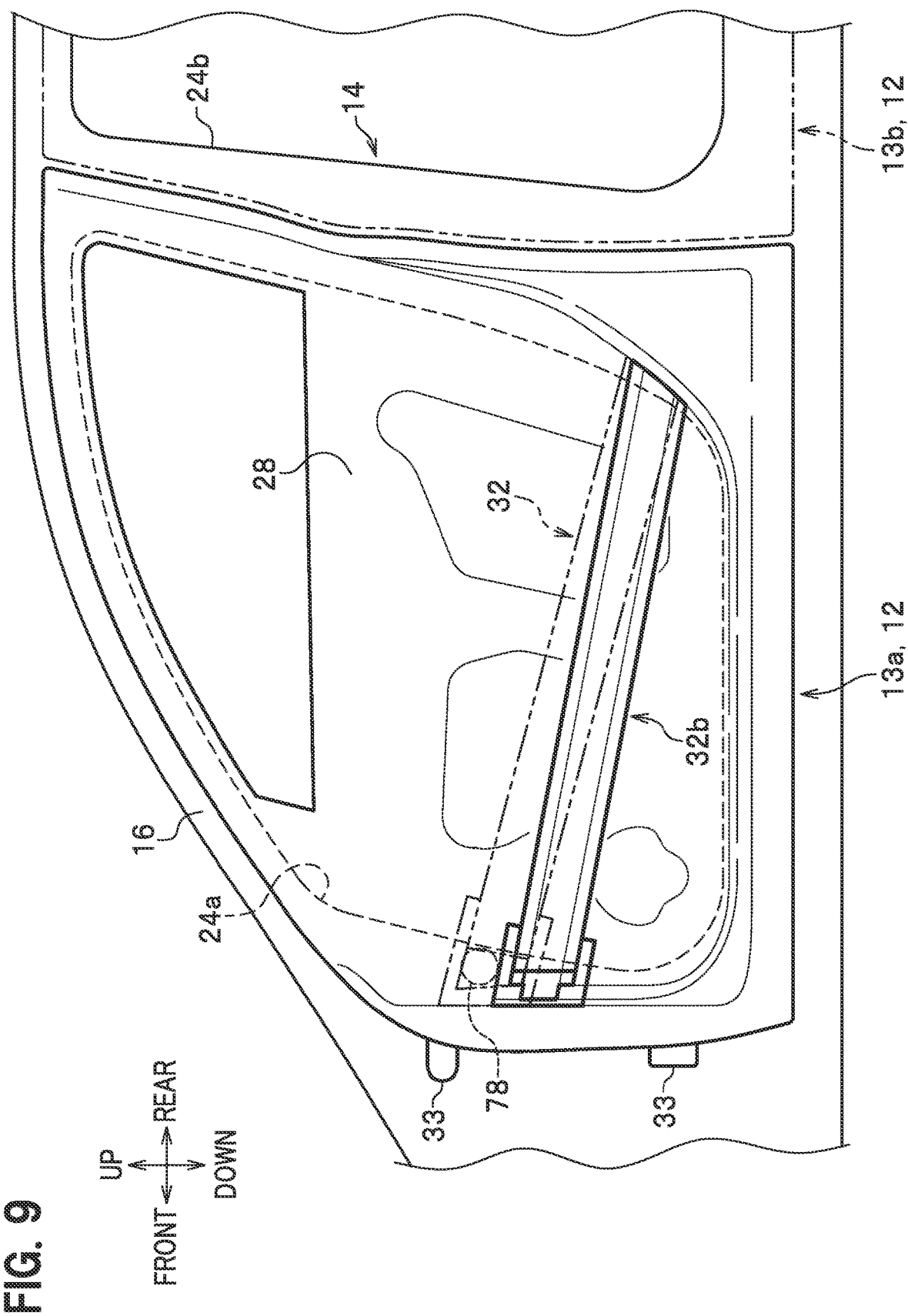
FIG. 9 is a partially imaginary side view showing a door beam structure according to a second modification.

Also, as shown in FIG. 9, in a second modification, the vehicle front-side end 34 of a door beam 32b may be disposed at a portion which is lower in the vehicle up-down direction than the height position at which the steering hanger 78 is disposed (see the dashed line) and near the upper door hinge member 33.

Figure 10:
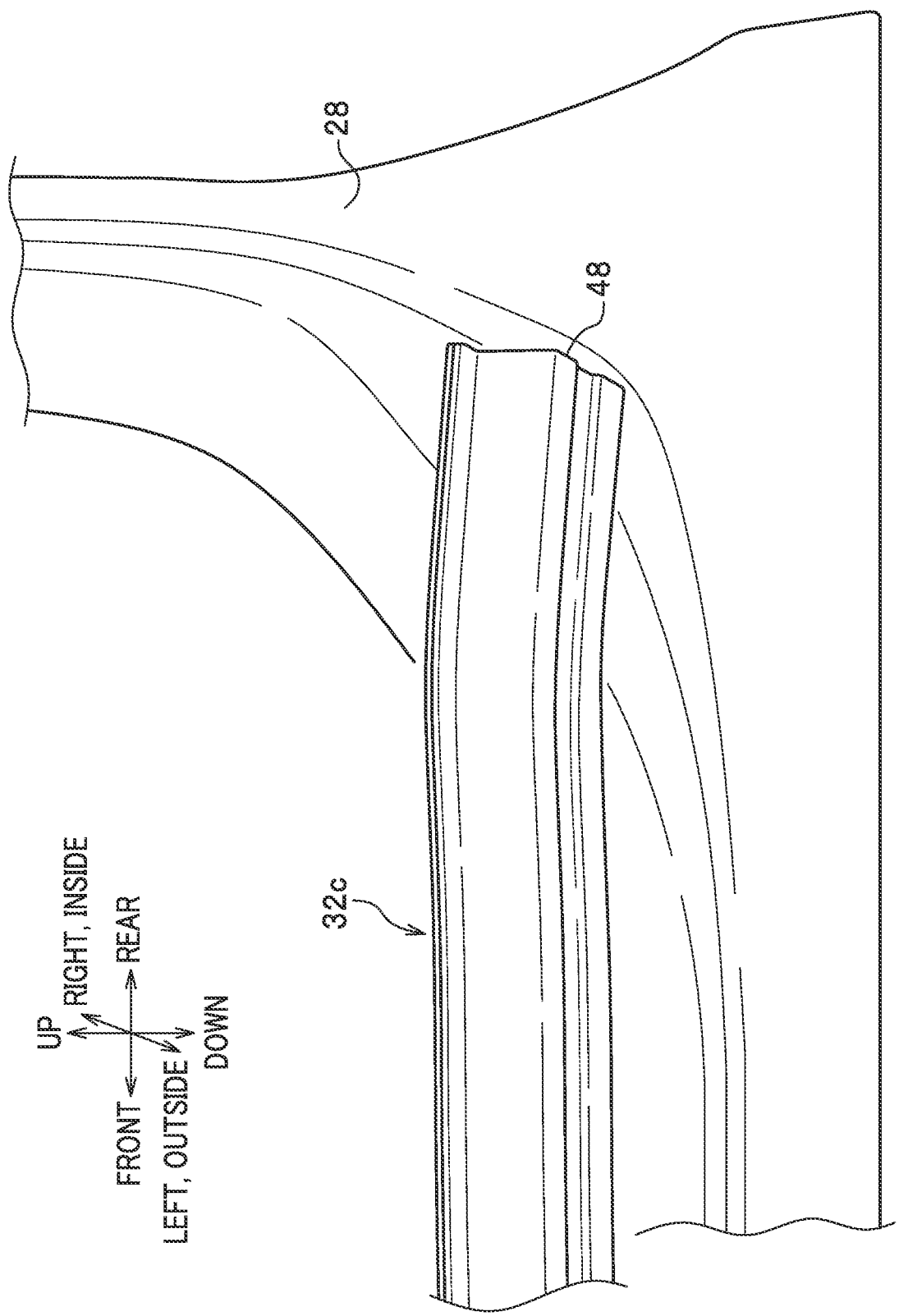
FIG. 10 is an enlarged perspective view showing a door beam structure according to a third modification.

Further, as shown in FIG. 10, a third modification differs from the above embodiment in that the reinforcement member provided at the vehicle rear-side end 48 of the door beam 32 (front reinforcement member 50) in the above embodiment is omitted and the vehicle rear-side end 48 of a door beam 32c is directly coupled to the door inner panel 28 at a position corresponding to the flaring portion 26 at a lower part of the center pillar 14. In the third modification, the vehicle rear-side end 48 of the door beam 32c is disposed to face a side face of the center pillar 14 within the front door opening portion 24a. Thus, in the third modification, when a side collision load is input, the vehicle rear-side end 48 of the door beam 32c is sandwiched between the door skin 30 and the flaring portion 26 of the center pillar 14. This can improve the side collision performance.

Figure 11:
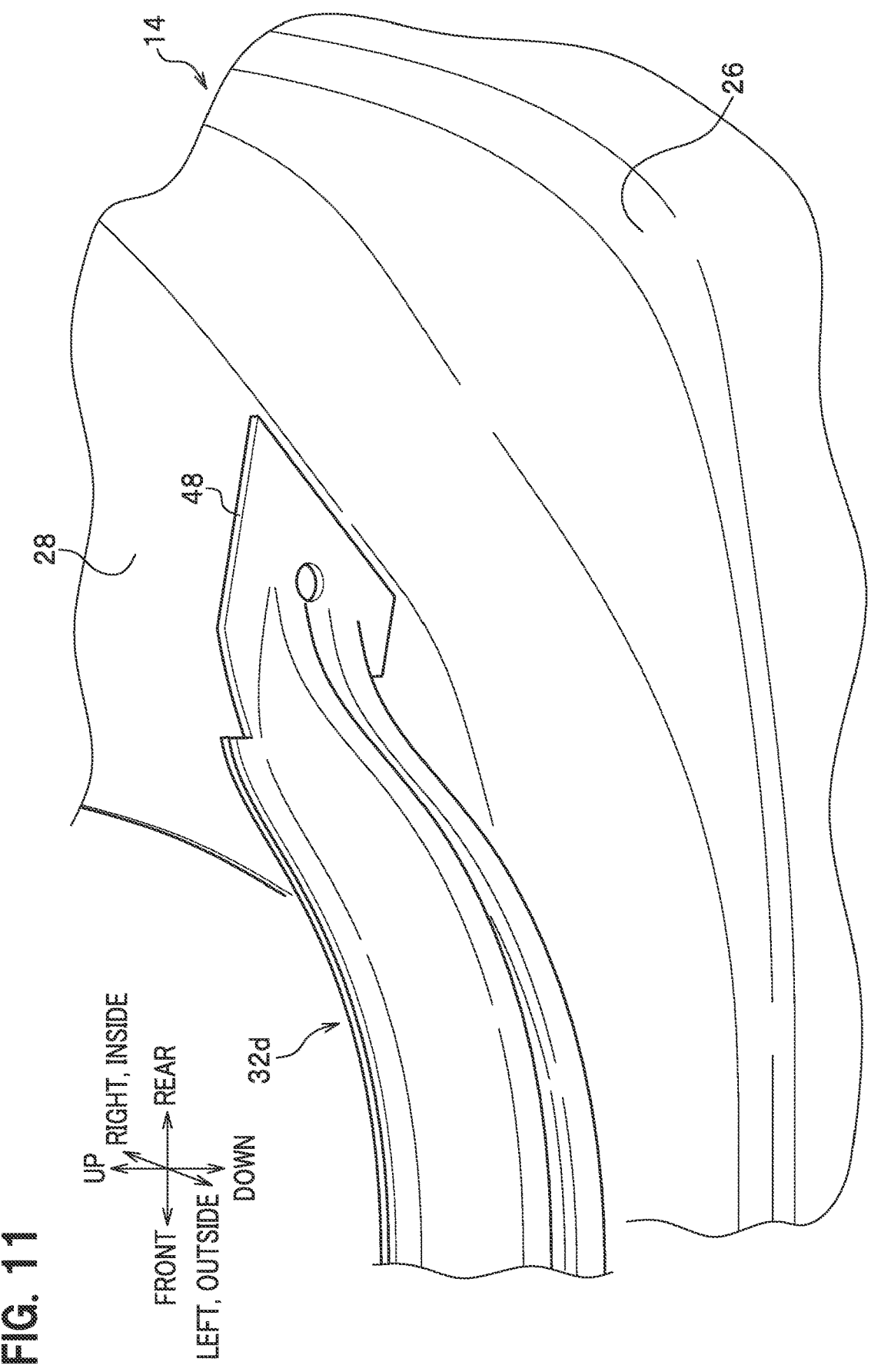
FIG. 11 is an enlarged perspective view showing a door beam structure according to a fourth modification.

Furthermore, as shown in FIG. 11, a fourth modification differs from the above embodiment in that the reinforcement member provided at the vehicle rear-side end 48 of the door beam 32 (front reinforcement member 50) in the above embodiment is omitted and the vehicle rear-side end 48 of a door beam 32d is coupled to the door inner panel 28 at a vehicle front-side position before the flaring portion 26 of the center pillar 14. Accordingly, in the fourth modification, the number of components is reduced as a result of omitting the reinforcement member, which enables a reduction in manufacturing cost.

It is understood that the foregoing description is that of the preferred embodiments of the invention and that various changes and modifications may be made thereto without departing from the spirit and scope of the invention as defined in the appended claims.

What is claimed is:

1. A door beam structure comprising:
a door beam attached to a side door so as to extend along a longitudinal axis of a vehicle,
wherein the door beam has a curved shape extending outwardly along a transverse axis of the vehicle and is spaced apart from a door skin in an inward direction along the transverse axis as the door beam extends to opposite end portions, along the longitudinal axis, of the door beam,
wherein a vehicle front-side end of the door beam extends to a position at which the vehicle front-side end overlaps a steering hanger as viewed from a vehicle width direction.

2. The door beam structure according to claim 1,
wherein a space is between the vehicle front-side end of the door beam and a side surface, located inwardly along the transverse axis, of the side door,
the door beam structure further comprising a coupling member in the space.

3. A door beam structure comprising:
a door beam attached to a side door so as to extend along a longitudinal axis of a vehicle,
wherein the door beam has a curved shape extending outwardly along a transverse axis of the vehicle and is spaced apart from a door skin in an inward direction along the transverse axis as the door beam extends to opposite end portions, along the longitudinal axis, of the door beam,
wherein the vehicle has a door opening configured to be opened and closed by the side door,
wherein a second end portion of the door beam is disposed such that the second end portion and a side surface of a center pillar face each other in the door opening,
wherein the side door comprises an inner panel,
wherein the inner panel is provided with a reinforcement member, and
wherein the reinforcement member extends from a first surface, facing the second end portion of the door beam, of the inner panel so as to cross over a second surface, located outwardly along the transverse axis, of the center pillar.

4. A door beam structure comprising:
a door beam attached to a side door so as to extend along a longitudinal axis of a vehicle,
wherein the door beam has a curved shape extending outwardly along a transverse axis of the vehicle and is spaced apart from a door skin in an inward direction along the transverse axis as the door beam extends to opposite end portions, along the longitudinal axis, of the door beam,
wherein the door beam comprises a middle section along the longitudinal axis,
wherein the middle section comprises an apex portion, the apex portion being located most outwardly along the transverse axis in the middle section, and
wherein the door beam has a clearance between the middle section and an inner surface of the door skin, the clearance being minimum at the apex portion, and
wherein the apex portion is located apart from a center portion, along the longitudinal axis, of the door beam in a rearward direction along the longitudinal axis.

5. The door beam structure according to claim 4, wherein the door beam comprises a vehicle front-side end, and
wherein the vehicle front-side end is disposed such that the vehicle front-side end and a door hinge member are proximately located along a vertical axis of the vehicle.

6. The door beam structure according to claim 4, wherein the door beam includes a vehicle front-side end opposite to a center pillar, and
wherein at least the vehicle front-side end is provided with a fragile portion.

* * * * *